United States Patent [19]

Egan

[11] 4,359,078
[45] Nov. 16, 1982

[54] PNEUMATIC TIRE HAVING PUNCTURE SEALING FEATURE AND METHOD OF MAKING SAME

[75] Inventor: William E. Egan, Tallmadge, Ohio

[73] Assignee: The Goodyear Tire & Rubber Company, Akron, Ohio

[21] Appl. No.: 174,967

[22] Filed: Aug. 4, 1980

Related U.S. Application Data

[63] Continuation of Ser. No. 20,291, Mar. 14, 1979, abandoned.

[51] Int. Cl.³ .............................................. B60C 21/08
[52] U.S. Cl. .................................... 152/347; 106/33; 156/115
[58] Field of Search ............... 152/347, 346; 156/115, 156/97; 106/33

[56] References Cited

U.S. PATENT DOCUMENTS

| | | |
|---|---|---|
| 2,566,384 | 9/1951 | Tilton, Jr. .......................... 152/347 |
| 2,756,801 | 7/1956 | Iknayan et al. ..................... 152/347 |
| 2,765,018 | 10/1956 | Connell ............................. 152/347 |
| 2,827,098 | 3/1958 | Semesen et al. .................... 152/347 |
| 3,935,893 | 2/1976 | Stang et al. ........................ 152/347 |

Primary Examiner—Michael W. Ball
Attorney, Agent, or Firm—H. C. Young, Jr.

[57] ABSTRACT

A self-sealing pneumatic tire comprised of a cured rubber tire casing having a fitted, adherent sealant composite strip on its inner surface comprised of an admixture of (A) a partially crosslinked butyl type rubber, (B) plasticizer therefor, (C) butyl rubber-compatible tackifier and (D) particulate reinforcement.

2 Claims, 3 Drawing Figures

PNEUMATIC TIRE HAVING PUNCTURE SEALING FEATURE AND METHOD OF MAKING SAME

This is a continuation of application Ser. No. 20,291, filed Mar. 14, 1979, now abandoned.

TECHNICAL FIELD

This invention relates to a puncture sealing pneumatic tire. This invention particularly relates to a pneumatic tire of the tubeless type having a puncture sealant feature.

BACKGROUND ART

Modifications to pneumatic tires have historically been sought for retarding or preventing their deflation upon being punctured. Many methods, sealants and tire constructions have been suggested and offered for ordinary passenger vehicle tires for automobiles which are to be driven over open roadways. Fluid and semi-solid puncture sealant coatings which seal by flowing into the puncture hole have been unsuccessful primarily because they tend to cause the tire to become out of balance and also because many times they are not operable or effective over a wide temperature range extending from summer to winter conditions. Central cores of cellular material which will physically maintain the tire shape when punctured generally place a restriction on the vehicular maximum speed because of eventual breakdown or destruction of the cells by the effects of heat and distortion.

It is, therefore, an object of this invention to provide a puncture sealing pneumatic tire which has ability to seal against puncturing objects or to provide a slow, relatively controlled, leak rate upon being punctured.

DISCLOSURE AND PRACTICE OF INVENTION

In accordance with this invention, a self-sealing pneumatic tire is provided which comprises a tire casing having a fitted, adherent sealant composite strip, or sheet, on its inner surface comprised of an admixture of (A) a partially crosslinked rubber selected from at least one butyl and halobutyl rubber, (B) plasticizer for said partially crosslinked rubber, (C) butyl rubber-compatible tackifier for said composite and (D) particulate reinforcement for said composite.

In further accordance with this invention, a puncture sealing pneumatic tire of the tubeless type is provided having two spaced, essentially inextensible beads, a crown portion generally having an outer ground contacting tread, a pair of individual sidewalls extending radially from the axial outer edges of said crown portion to join the respective beads, a supporting or reinforcing structure for said crown portion and sidewalls, usually extending from bead to bead and often referred to as a carcass, and said sealant composite strip adhered to its inner surface. It is preferred that the sealant composite sheet is positioned and adhered circumferentially around the inside of the tire on its inner surface in the area of its crown portion, therefore, opposite the tread, although it can, if desired, cover a major portion or entire inner surface of the tire by extending essentially from bead-to-bead.

The sealing composite strip can be applied in a unitary sheet form, as a multiple of individual strips or as a relatively narrow individual strip spirally adhered circumferentially around the inner surface of the crown portion of the tire.

The adherent, sealant composite on the inside surface of the tire has a thickness in the range of about 0.1 (0.25) to about 0.3 (0.76), preferably about 0.12 (0.3) to about 0.2 (0.5) inches (cm). Thus, a desirable thickness can be in the range of about 0.12 (0.3) to about 0.25 (0.6) or 0.3 (0.76) inch (cm).

The sealant composite, adhered to the inside surface of the tire is particularly valuable for sealing against puncturing objects and for sealing holes left upon their removal, over a wide range of temperatures, such as from −40° C. to 120° C., preferably about −20° C. to 100° C., therefore, including the range of about −20° C. to about 120° C. The sealant is also particularly valuable because of its resistance to flow, or a relative resistance to change in its physical state after being applied to the inner surface of the tire. Thus, it exhibits an enhanced degree of dimensional stability.

Uniquely, therefore, the sealant composite is applied and adhered to the interior surface of a cured pneumatic rubber tire of the tubeless type in strip or sheet form having a dimensional stability and resistance to flow as opposed to a fluid being spray coated, brushed or poured onto the interior surface of the tire.

Accordingly, the sealant composite sheet, or adherent layer is provided as an admixture of (A) 100 parts of at least one partially crosslinked butyl-type rubber selected from halobutyl or butyl rubber, (B) about 25 to about 150 parts by weight of at least one plasticizer for said rubber, selected from at least one of paraffinic, naphthenic, or aromatic oils, pine tar or liquid synthetic polymeric plasticizers, (C) about 2 to about 50 parts by weight of a tackifying resin for said rubber to enhance its tack selected from natural and synthetic tackifying resins for rubber having a softening point in the range of 80° C. to 120° C., and (D) about 10 to about 150 parts by weight of granular rubber reinforcement selected from at least one of carbon black and inorganic rubber reinforcement agents.

The butyl rubber is of the type prepared by polymerizing a mixture of isobutylene and isoprene, with the major portion being isobutylene and also by modifying such a rubber with a halogen substitution. Typically, it is preferred that the halo substitution is chlorine or bromine. The halo substitution can generally be accomplished, for example, by halogenating the butyl rubber. The butyl or halobutyl rubber is partially crosslinked to an extent characterized by about 10 to about 90 percent, preferably about 20 to about 80 percent soluble in cyclohexane at about 80° C. This compares to about 2 percent soluble for a lesser crosslinked butyl and only about 98 weight percent soluble for a higher crosslinked butyl.

The butyl rubber typically has an average molecular weight in excess of 100,000, preferably in the range of 200,000 to 400,000 and even more preferably in the range of about 300,000 to about 400,000. As already pointed out, the butyl rubber is partially crosslinked. The partially crosslinking of the butyl rubber is intended to provide a composite which is not fully cured so that it is not fully resilient and has some capability of deforming under force or pressure, as opposed to the more resilient, rubbery matrix of a fully cured material. However, the partially cured composite is intended to be distinguished from one which has little or no cure at all so that it maintains the required degree of dimensional stability.

In these regards, the crosslinking of the butyl rubber can be accomplished by various means. Such methods include outright curing with a sulfur or quinoid system. Purely peroxide cure systems are not preferred because they generally provide too complete or efficient of a cure. Alternately, cure-promoting agents can be included in the polymerizate which enhances a crosslinking of the butyl upon or after its recovery from the polymerization system. Generally, such crosslinking methods and techniques are known to those having skill in the art and it is considered that the technology need not be repeated here.

Various rubber tackifying, thermoplastic resins can be used in the practice of this invention to enhance the composite's ability to seal around the puncturing. Obviously, a primary purpose is to increase the inherent tack of the composite of this invention. Accordingly, it is intended that such resins of the type normally considered as rubber tackifiers, compatible or easily mixed with the butyl rubbers. Representative of such resins are thermoplastic polymers having a softening point according to ASTM No. E28-58T, in the range of about 80° to 120° C. Such tackifiers may include natural resins and polyterpenes, synthetic polyterpentenes, thermoplastic polyolefins, pentaerythritol, esters of hydrogenated resins, thermoplastic hydrocarbon resins and phenol-formaldehyde resins. Particularly useful resins are olefin/diolefin polymerizates with aluminum chloride and phenol-formaldehyde-type resins.

The particulate reinforcement is in granular form and is of the rubber reinforcement type. Typically, it has a particular size in the range of about 200 to about 400 U.S. Standard Sieve size. Representative examples of various reinforcing agents are finely divided, well-known rubber reinforcing agents such as carbon black and inorganic materials, such as zinc oxide, titanium dioxide, aluminum hydrate, lithopone whiting clays, hydrated silicas, calcium silicates, silica aluminates, magnesium oxide and magnesium carbonate.

It is to be understood that other conventional rubber compounding ingredients can be included in the composite mixture such as antioxidants, antiozonants, coloring pigments, stabilizers and accelerators.

The components of sealant composite can be dry mixed by conventional means, such as by internal mixers, mill mixing, calendering or extrusion to form a tacky sheet or strip having sufficient structural integrity to have a resistance to flow.

The sealant composite can be conveniently applied in its sheet form, such as in the nature of a strip, to the inner surface of a cured rubber tire by the sequential steps of (A) optionally and preferably cleaning or preparing the inner surface of the tire by (i) cleaning with an aqueous detergent solution or hydrocarbon solvent and allowing it to dry and/or (ii) buffing or abrading the surface to roughen it, (B) optionally and preferably heating the tire to a temperature in the range of about 40° C. to about 80° C., (C) optionally, applying a thin coating of a cement to the prepared inner tire surface which can be conveniently coated as a fluid by spraying, brushing or swabbing, and (D) applying and adhering said sheet, or strip, of sealant composite to the inner surface of the tire or to the optional cement coat, if used.

It is to be appreciated that the sealant composite can be applied circumferentially to the inner surface of the tire in its crown area as a unitary sheet or as a narrow strip applied in a spiral fashion with sufficient revolutions to achieve a desired width of the composite.

The method or operation of the sealing effect against a puncturing object or the sealing of the hole in the tire is by mechanical means of the sheet composite sealing around the puncturing object or sealing the hole itself, relying on both the tack and plasticity of the composite to stick to the nail or puncturing object, and by flowing into the hole as the nail or object is pulled through the sealant composite.

The tire of this invention can self-seal against various puncturing objects depending somewhat upon the tack, resiliency and thickness of the sealant composite as well as the puncturing object. Typically, the tire can self seal punctures caused by nails and objects of various sizes. Representative of such nails are No. 4 to 6 nails and nails generally having a diameter up to about 0.25 (0.63) inch (cm).

The vulcanized rubber tire itself can be of various cured or vulcanized rubbers such as natural rubber and synthetic rubber and their mixtures or blends. For example, it can be rubbery butadiene-styrene copolymers, butadiene-acrylonitrile copolymers, cis-1,4-polyisoprene, polybutadiene, isoprene-butadiene copolymers, butyl rubber, halogenated butyl rubber, such as chloro or bromobutyl rubber, ethylene-propylene copolymers, ethylene-propylene terpolymers (EPDM's), elastomeric copolyesters and polyurethane elastomers. Typically, the various polymers are cured or vulcanized by normal curing methods and recipes.

The invention can be further understood with respect to the accompanying drawings wherein.

Figure 1:
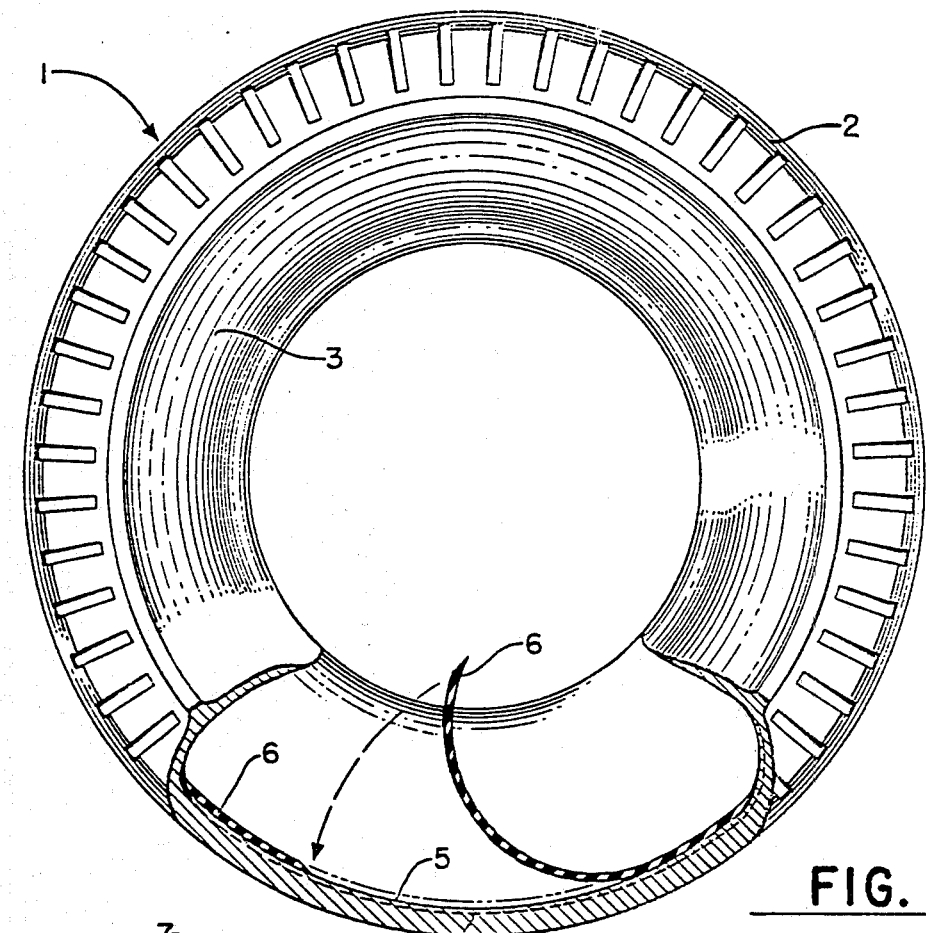
FIG. 1 is a side elevational view of a shaped, molded and cured pneumatic tire with a cut-away portion showing the circumferential application of an adherent, cured, layer of the sealant composite of this invention to its inner surface in its crown area opposite its tread.

More specifically, in the drawings, a tubeless pneumatic rubber tire 1 is shown having the customary tread portion 2, sidewalls 3 and support member 4, which typically contains plies to back and reinforce the tread and sidewall portions as well as an air barrier layer 5, and particularly a solid, inner, adherent sealant composite of this invention 6.

With further reference to the figures, the practice of this invention is more clearly depicted by showing the application of the sealant composite 6 having sufficient dimensional stability to be applied as a sheet or strip to the inner surface of the cured tire in its crown area opposite its tread as opposed to a fluid composite which would require a spray, brush or swab application.

Figure 2:
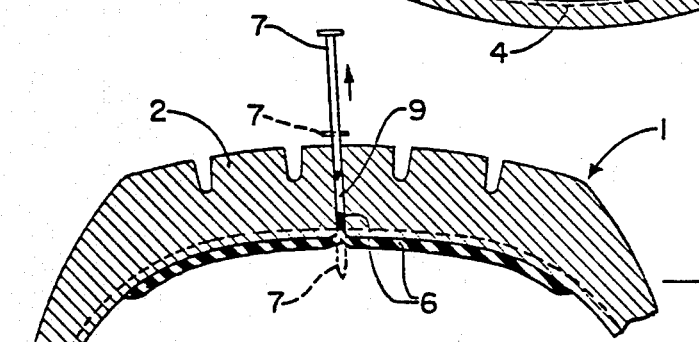
FIG. 2 is an enlarged cross-sectional view of the tire of FIG. 1 at its tread portion illustrating the unitary sheet of said sealant composite.

With further reference to the figures, particularly FIG. 2, the practice of this invention is more clearly depicted by showing the actual puncturing of the pneumatic tire 1 with a nail 7 and the automatic sealing of the tire by the sealant composite 6. The nail is then removed to leave the hole 9 in the tire extending through the sealant composite 6. The sealant composite 6 acts to seal the hole 9 by being pulled into the hole as the nail is removed.

The sealant composition is formulated to contain certain specific constituents within narrow and defined composition ranges. The difficulty lies in providing a composition which has the ability to both re-heal cuts in the sealant caused by a puncture and to seal against a puncturing object or a puncture hole at temperatures ranging from about −20° F. to 130° C. Once the hole has been filled, which must occur very rapidly, the sealant is to have sufficient strength and stability to maintain air under pressures, generally at least up to 24 and preferably up to 40 psig (pounds per square inch-gauge) and sometimes even higher while the tire is being flexed and stressed during normal vehicle use. The sealant composite has been tested and found effective under general conditions at temperatures up to 130° C., although automotive tires in normal usage do not generally experience temperatures above about 60° C.

The practice of this invention is further illustrated by reference to the following examples which are intended to be representative rather than restrictive of the scope of the invention. Unless otherwise indicated, all parts and percentages are by weight.

EXAMPLE I

A tubeless pneumatic rubber tire was prepared, shaped and cured of the HR78-15 type having a ground contacting tread, spaced beads, connecting sidewalls and supporting carcass structure corresponding generally to FIG. 1.

Figure 3:
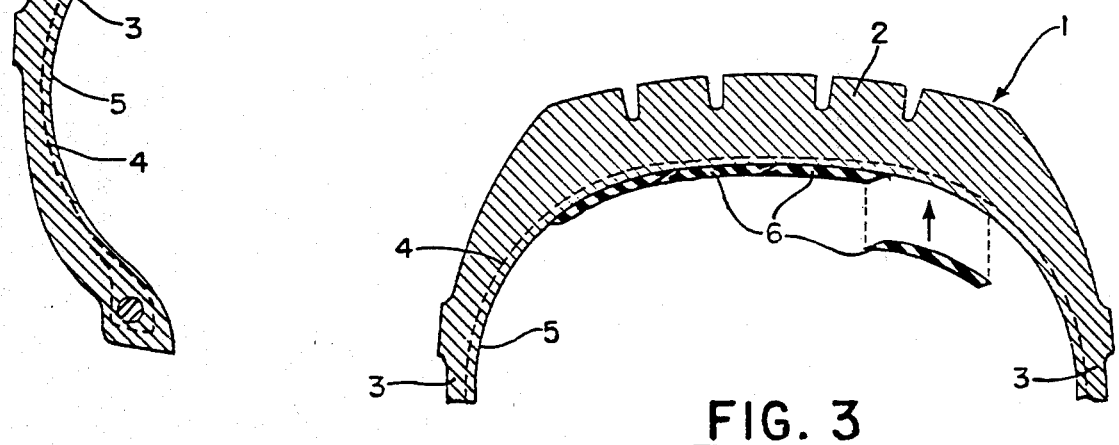
FIG. 3 is an enlarged cross-sectional view of FIG. 1 at its crown and tread portion illustrating the circumferential application of a sheet in the form of a narrow strip of said sealant composite applied in a spiral fashion in sufficient revolutions to achieve a desired width of said composite.

A strip, or sheet, of sticky sealant composite, about 8 inches wide and 0.125 inch thick, was circumferentially applied and adhered to the inside of the tires in its crown area, opposite its tread, with a cement in the manner generally shown in FIG. 3, although a unitary sheet could have been applied as in FIG. 2.

A cement had previously been applied as coating having a thickness of about 0.003 inch to the inside of the tire.

The sealant was prepared by mixing the components of the recipes shown in the following Table 1 and calendering to form a sheet.

TABLE 1

| Component | Parts |
| --- | --- |
| Butyl rubber, partially crosslinked[1] | 100 |
| Paraffinic oil, rubber plasticizer[2] | 40 |
| Phenol formaldehyde, rubber tackifying resin[3] | 5 |
| Polyisobutylene, rubber extender, plasticizer and tackifier[4] | 50 |
| Carbon black (HAF) | 90 |
| Zinc stearate | 2 |

[1]Obtained as Bucar Ex 262, a partially crosslinked butyl rubber from the Columbian Carbon Co., described as being crosslinked to the extent that it is 20 percent soluble in cyclohexane.
[2]Obtained as Flexon 766, a petroleum oil described as paraffinic from the Humble Oil and Refining Co.
[3]Obtained as SP-1068, a phenol formaldehyde resin from the Schenectady Chemical Inc.
[4]Obtained as Vistanex LMMS, a polyisobutylene from The Enjay Chemical Co.

The cement used consisted of 90 percent of a rubber solvent as a blend of low molecular weight paraffinic hydrocarbons and 10 percent of the recipe according to the following Table 2:

TABLE 2

| Component | Parts |
| --- | --- |
| Natural rubber | 100 |
| Rosin oil | 5 |
| Carbon black (HAF) | 30 |
| Zinc Stearate | 5 |
| Phenol formaldehyde resin[1] | 30 |
| Benzothiazole/guanidine | 2.5 |
| Sulfur | 1.5 |

[1]Obtained as SP-1068, a resin from the Schenectady Chemical Inc.

EXAMPLE II

A tubeless, pneumatic tire prepared according to Example I having the adherent sealant sheet composite applied as a spiral strip having a width of about 2 inches, adhered to its inner surface opposite its tread portion with an overall sealant width of about 8 inches was tested according to the following method along with a control tire.

The tire was mounted on a rim, inflated and allowed to rotate, under load, against a 67.5 inch diameter motor-driven wheel. The tire was tested according to procedure (AB-1101) at a speed of 50 miles per hour (mph) under a 1285 pound load with a hot inflation temperature of 30 pounds per square inch (psi). Under this test the tire was run for 100 miles for conditioning purposes and then punctured with a 0.18 inch diameter nail into and through a major tread groove. The tire was then allowed to run under the prescribed speed and load while its internal inflation pressure was periodically measured.

In these examples the sealant composite was provided essentially as an admixture of (A) a partially crosslinked butyl rubber, (B) a plasticizer for said rubber comprised of both a paraffinic oil and a semi-solid polyisobutylene, (C) a phenol formaldehyde rubber tackifying resin and (D) carbon black as a particulate rubber reinforcement.

In the practice of this invention, with regard to the polyisobutylene plasticizer, the polyisobutylene is required to be a semi-solid at 40° C., although generally such a polymer can be described as a semi-solid over a broad temperature range such as about 20° C. to 40° C. This is to distinguish such a polymer from a relatively hard, elastomeric polyisobutylene. In these regards, such a semi-solid polyisobutylene generally has an average molecular weight by osmometry in the range of about 400 to about 2500 and preferably in the range of about 1000 to about 2300. Its viscosity is generally in the range of about 50 to about 4500 and preferably in the range of about 400 to about 4300 centistokes at 210° F.

While certain representative embodiments and details have been shown for the purpose of illustrating the invention, it will be apparent to those skilled in this art that various changes and modifications may be made therein without departing from the spirit or scope of the invention.

I claim:

1. A method of preparing a pneumatic tire having a puncture sealing feature by applying a sealant composite to the inner surface of a cured rubber tire, the improvement which comprises applying the composite sealant to the inner surface of the cured tire in the form of a relatively narrow individual strip, having dimensional stability and resistance to flow, adhered circumferentially around the inner surface of the crown portion of the tire in a spiral fashion with sufficient revolutions to achieve a desired width of the sealant composite, utilizing the sequential steps of (A) optionally cleaning or preparing the inner surface of the tire by (i) cleaning with an aqueous detergent solution or hydrocarbon solvent and allowing it to dry and/or (ii) buffing or abrading the surface to roughen it, (B) optionally heating the tire to a temperature in the range of about 40° C. to about 80° C., (C) optionally applying a thin coating of a cement to the prepared inner tire surface and (D) applying and adhering said strip of sealant composite to the inner surface of the tire or to the optional cement coat; wherein said sealant composite, as applied to the inner surface of said cured rubber tire, consists essentially of an admixture of (A) 100 parts by weight of a partially crosslinked butyl rubber, said butyl rubber having been partially crosslinked prior to mixing with the remainder of the following ingredients (B), (C) and (D), and characterized by being partially crosslinked to an extent characterized by being about 20 to about 80 percent soluble in cyclohexane at about 80° C. and having a molecular weight in the range of about 200,000 to about 400,000;

(B) about 25 to about 150 parts by weight (i) oil selected from at least one of paraffinic, naphthenic, or aromatic oils and (ii) polyisobutylene characterized by being a semi-solid at 40° C.;

(C) about 2 to about 50 parts by weight tackifying resin for said rubber having a softening point in the range of about 80° C. to about 120° C. selected from at least one of the group consisting of thermoplastic olefin/diolefin polymerizate resins and phenolformaldehyde resins;

(D) about 10 to about 150 parts by weight of carbon black having a particulate size in the range of about 200 to about 400 U.S. Standard Sieve Size.

2. The pneumatic tire having a puncture sealing feature prepared according to the method of claim 1.

* * * * *